(12) United States Patent
Gentry

(10) Patent No.: US 10,207,804 B1
(45) Date of Patent: Feb. 19, 2019

(54) TEMPERATURE-CONTROLLED PAYLOAD CONTAINER

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 844 days.

(21) Appl. No.: 14/662,078

(22) Filed: Mar. 18, 2015

(51) Int. Cl.
*B64D 9/00* (2006.01)
*B64D 13/06* (2006.01)

(52) U.S. Cl.
CPC .............. *B64D 9/00* (2013.01); *B64D 13/06* (2013.01); *B64D 2013/0629* (2013.01)

(58) Field of Classification Search
CPC ............................ B64D 11/0007; B64D 11/04
See application file for complete search history.

(56) References Cited

U.S. PATENT DOCUMENTS

| | | | | |
|---|---|---|---|---|
| 3,315,474 A | * | 4/1967 | Farer | F25B 21/02 219/202 |
| 3,862,549 A | * | 1/1975 | Fernandes | B60H 1/00371 165/42 |
| 4,759,190 A | * | 7/1988 | Trachtenberg | B60N 3/103 62/3.62 |
| 5,322,244 A | * | 6/1994 | Dallmann | B64D 11/04 244/118.1 |
| 5,355,694 A | * | 10/1994 | Morrow | B60N 3/104 62/244 |
| 6,658,857 B1 | * | 12/2003 | George | F25B 21/04 165/121 |
| 6,666,032 B1 | * | 12/2003 | Rickson | A61J 1/165 62/3.6 |
| 7,007,494 B2 | * | 3/2006 | Al Rashidi | A47J 36/2483 165/41 |
| 7,024,874 B2 | * | 4/2006 | Zywiak | B64D 11/04 62/199 |
| 7,043,926 B2 | * | 5/2006 | Smith | B60H 1/00014 62/199 |
| 7,740,201 B2 | * | 6/2010 | Eichholz | B64C 1/18 244/118.1 |
| 7,849,931 B2 | * | 12/2010 | Ng | A62C 3/08 169/16 |
| 9,238,398 B2 | * | 1/2016 | Lu | B60H 1/00592 |

(Continued)

*Primary Examiner* — Kenneth Rinehart
*Assistant Examiner* — Deepak A Deean
(74) *Attorney, Agent, or Firm* — Lee & Hayes, PC

(57) ABSTRACT

A temperature-controlled payload container that may be used by an unmanned aerial vehicle (UAV) to transport perishable items and/or items desired to be at or near a specific temperature upon arrival at a destination. The temperature-controlled payload container may be used to maintain or adjust a temperature of a delivery item, such as a food item. In some embodiments, the temperature-controlled payload container may be capable of heating items in a first portion of the container and cooling items in a second portion of the container. For example, the container may be divided by a Peltier junction, which is an electrified junction of two different conductors. In some embodiments, the temperature-controlled payload container may receive heat generated from operation of the UAV.

20 Claims, 8 Drawing Sheets

(56) References Cited

U.S. PATENT DOCUMENTS

| | | | | |
|---|---|---|---|---|
| 2004/0139757 A1* | 7/2004 | Kuehl | ............... | B60H 1/00592 |
| | | | | 62/237 |
| 2005/0091988 A1* | 5/2005 | Stewart | ................. | B60P 3/007 |
| | | | | 62/3.1 |
| 2005/0098684 A1* | 5/2005 | Gullerud | ............... | B64D 13/08 |
| | | | | 244/129.1 |
| 2005/0192724 A1* | 9/2005 | Hendry | ............. | B60H 1/00735 |
| | | | | 701/36 |
| 2006/0219842 A1* | 10/2006 | Shell | ..................... | B64D 13/06 |
| | | | | 244/118.5 |
| 2009/0049845 A1* | 2/2009 | McStravick | ............ | F25B 21/02 |
| | | | | 62/3.62 |
| 2011/0084162 A1* | 4/2011 | Goossen | .............. | B64C 39/024 |
| | | | | 244/12.1 |
| 2012/0055180 A1* | 3/2012 | Larson | ............. | B60H 1/00014 |
| | | | | 62/80 |
| 2013/0048264 A1* | 2/2013 | Lu | .......................... | G05D 23/00 |
| | | | | 165/287 |
| 2013/0285440 A1* | 10/2013 | Pan | ........................ | B60L 8/003 |
| | | | | 307/9.1 |
| 2014/0032034 A1* | 1/2014 | Raptopoulos | ........ | G08G 5/0069 |
| | | | | 701/25 |
| 2016/0152345 A1* | 6/2016 | Molnar | ................ | B64C 39/024 |
| | | | | 244/39 |
| 2016/0178252 A1* | 6/2016 | Nakamura | ........... | F25D 11/006 |
| | | | | 62/3.3 |

* cited by examiner

TEMPERATURE-CONTROLLED PAYLOAD CONTAINER

BACKGROUND

Package delivery by an unmanned aerial vehicle (UAV) presents many challenges and design considerations. When delivering containers with a UAV, size and weight of containers (and items within the containers) are considered prior to initiating the delivery. If a container is too big or too heavy, the UAV may be unable to transport it.

Another aspect of UAV operation is energy consumption. Size, weight, and energy consumption by a payload container impacts energy consumption of a UAV for various reasons. For example, the UAV may expend extra energy lifting a heavier container than when lifting a lighter container. If the container draws energy from the UAV, such as to power lights or other components, then this energy drain also impacts the UAV's limited power resources.

Delivery of food and other perishable items presents many challenges. Besides time constraints that help keep items fresh and enjoyable by recipients, some items may be desired to be maintained within specific temperature ranges and/or arrive at a destination having a specific temperature. For example, milk is kept relatively cold during transit to avoid spoilage.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
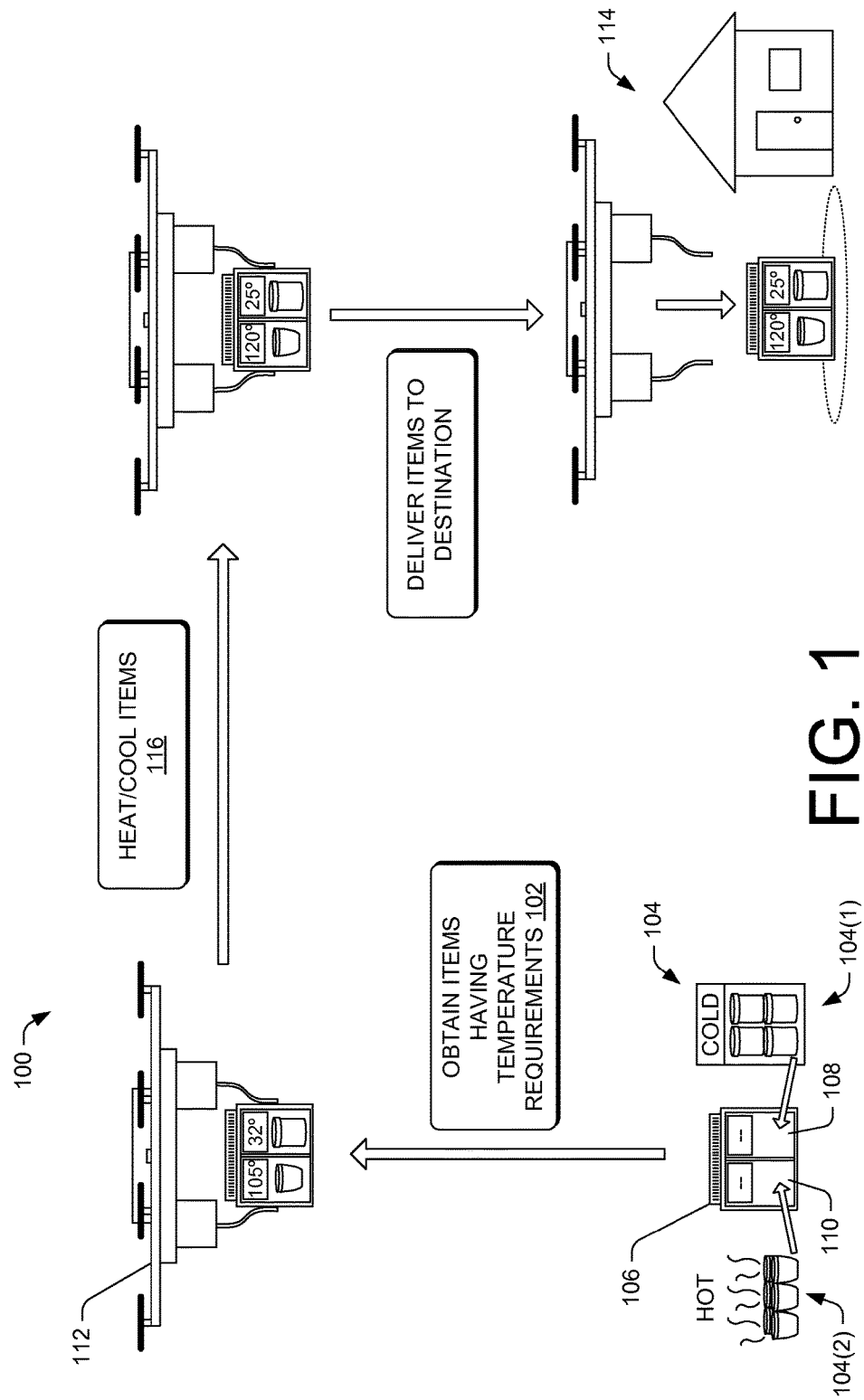
FIG. 1 is a pictorial flow diagram of a process to deliver a temperature-controlled payload container by an unmanned aerial vehicle (UAV) to a destination while controlling temperature of the container during at least a portion of the flight.

This disclosure is directed at least partly to a temperature-controlled payload container that may be used by an unmanned aerial vehicle (UAV) to transport perishable items and/or items desired to be at or near a specific temperature upon arrival at a destination. For example, when a pizza is made to order and delivered, a recipient typically expects the pizza to be hot and ready to eat immediately. Some food items are sensitive to changes and temperature, and may spoil or spoiler sooner than expected if subjected to certain temperature ranges for a prolonged amount of time. For example, milk may spoil or spoiler sooner if left in a hot car for a prolonged period of time. As yet another example, ice cream may melt if exposed to heat for even a short amount of time. The temperature-controlled payload container may be used to maintain or adjust a temperature of a delivery item, such as a food item.

In some embodiments, the temperature-controlled payload container may be capable of heating items in a first portion of the container and cooling items in a second portion of the container. For example, the container may be divided by a Peltier junction, which is an electrified junction of two different conductors. Depending on the flow of current through the junction, one side of the Peltier junction is heated while the other side is cooled (by removal of heat). Heating coils and/or heat pumps may also be used to heat a portion of a container. In various embodiments, other heating or cooling elements may be used in combination. For example, dry ice may be used with the Peltier junction to keep the cool side at an even lower temperature. Heating coils may be used with the Peltier junction to keep the hot side at an even hotter temperature. The container may include insulated walls to reduce environmental-caused changes to internally controlled temperatures.

In accordance with at least some embodiments, the temperature-controlled payload container may draw heat or cool air from the UAV that transports the container. For example, heat generated by components of the UAV, such as motors, controllers, processors, and other heat generating components may be captured (e.g., wicked from components) through ducts that transport a fluid. The fluid, once heated, may be pumped through the container to provide heat to at least a portion of the container. The fluid may cycle through the container and UAV to continually provide heat to the container while acting to remove heat from components of the UAV. A similar system may be used to cool fluid prior to entry into the container. For example, the UAV may include a compressor (and possible engine to power the compressor) to cause the fluid to be cooled using a refrigeration cycle, or the fluid may be cooled by being subject to directed airflow of cool air via downdraft from rotors or air resistance from forward flight, for example.

The UAV or the temperature-controlled payload container may include a temperature controller to control a temperature of internal compartment(s) of the container. In some embodiments, the temperature controller may determine a current exterior temperature, an ideal temperature of an item of payload (e.g., food to be delivered, etc.), a current temperature of the item of payload, and a time until delivery. The temperature controller may then adjust a temperature setting to cause the temperature-controlled payload container to achieve the ideal temperature of the item of payload at or prior to arrival at the destination.

In some embodiments, the temperature-controlled payload container may include a power source, heating element, and/or cooling element to enable continued heating and/or cooling after the temperature-controlled payload container reaches the destination. For example, the UAV may leave the temperature-controlled payload container at the destination. The temperature-controlled payload container may continue to heat and/or cool the payload for some time after being delivered. For example, a battery coupled to the temperature-controlled payload container may provide current to the Peltier junction or a heating coil. A solar panel or solar absorption panel may provide heat to the item, possibly by creating greenhouse effect within a portion of the container.

The techniques and systems described herein may be implemented in a number of ways. Example implementations are provided below with reference to the following figures.

FIG. 1 is a pictorial flow diagram of a process 100 to deliver a temperature-controlled payload container by a UAV to a destination while controlling temperature of the container during at least a portion of the flight.

At 102, items 104 having temperature requirements may be obtained. The items may be obtained from a fulfillment center, a restaurant, a grocery store, and/or any other distribution location. The items may be placed in a temperature-controlled payload container 106 ("container 106"). Cold items 104(1) may be placed in a cold compartment 108 of the container 106 while hot items 104(2) may be placed in a hot compartment 110 of the container 106. Compartments of the container 106 may or may not be predetermined as hot or cold. For example, a container may be used for either hot or cold depending on the heating/cooling needs and systems available and used to achieve heating and/or cooling, as discussed herein. The container 106 may be closed and sealed for delivery. A UAV 112 may couple to one or more coupling mechanisms of the container 106 to transport the items 104 to a destination 114, such as a residence of a consumer that purchased the items 104.

At 116, the container 106 may provide heating and/or cooling to the items during transport of the items 106 by the UAV 112. As discussed above, the UAV 112 may assist in providing the heating/cooling, such as by providing control signals to heating/cooling systems, generating heat during operation, which may be transferred to the container 106 through fluid ducts, activated heating coils (e.g., resistance coils, ceramic plates, etc.), operating a compressor to create a refrigeration cycle, and/or in other ways discussed herein.

As shown in FIG. 1, the hot items may have a current temperature of 105 degrees F. while the cold items may have a current temperature of 32 degrees F. However, the hot items may have an ideal temperature of 120 degrees F. while the cold items may have an ideal temperature of 25 degrees F. During the transport by the UAV, the container 106 and/or the UAV 112 may adjust heating/cooling to enable the respective items to realize the respective ideal temperatures. By doing this, the hot items (e.g., soup, pizza, sandwich, beef patty, etc.) may arrive ready for consumption by a customer while the cold items (e.g., ice cream, cheese, milk, lettuce/tomato, etc.) may arrive in a desired condition without spoilage or degradation in quality. In some embodiments, the time of flight may be a matter of minutes; however, longer travel times are possible when customers live in remote locations. The items 104 may be placed in the container 106 well before the UAV 112 initiates flight. In some embodiments, the container 106 may initiate heating/cooling prior to flight, such as by utilizing local resources (e.g., alternating current (AC) power, etc. at a fulfillment center.

At 118, the UAV 112 may deliver the items to the destination 114. In some embodiments, the UAV 112 may deposit some or all of the container 106 at the destination. For example, the UAV 112 may deposit the container 106 that includes some systems to maintain heat/cold of the items for a predetermined amount of time (e.g., until the consumer gets home from work, etc.). The systems may include insulation and/or heating/cooling systems. The heating/cooling systems may require electrical energy, thus the container 106 may include a power source, such as a battery, solar panel, or other power source. In various embodiments, the UAV 112 may power down to allow a consumer to approach the container 106 and retrieve the items 104. Once the consumer has retrieved the items and the area proximate the UAV 112 is determined to be clear of obstacles, the UAV may power up and resume flight.

Figure 2:
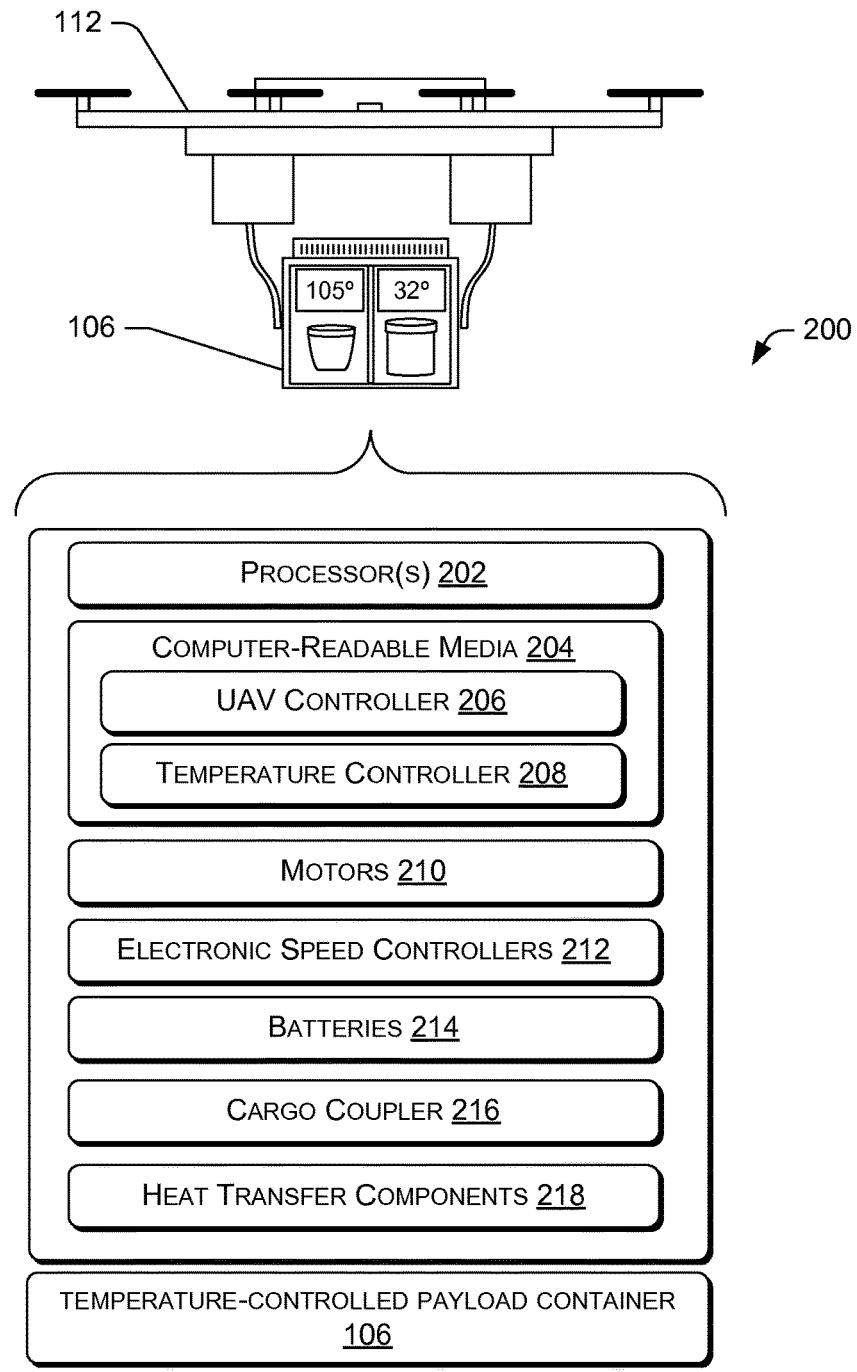
FIG. 2 is a block diagram of illustrative components of a UAV configured to operate with a temperature-controlled payload container.

FIG. 2 is a block diagram of illustrative components 200 of a UAV configured to operate with a temperature-controlled payload container. The components 200 may include one or more processors 202 and one or more computer readable media 204 that stores various modules, applications, programs, or other data. The computer-readable media 204 may include instructions that, when executed by the one or more processors 202, cause the processors to perform at least some of the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by download.

In some embodiments, the computer-readable media 204 may store a UAV controller 206 and a temperature controller 208, which are described in turn. The UAV controller 206 may control aspects of flight of the UAV, including use of motors 210 used to power rotors and electronic speed controllers 212 that regulate the motors. The UAV controller 206 may also monitor capacity and status of one or more batteries 214 that provide power to the motors 210, the processors 202, and other electronic equipment on board the UAV 112. The batteries 214, as described herein, may include voltage regulator systems and/or other power management systems associated with use of batteries. The UAV controller 206 may also control a cargo coupler 216, which may identify cargo and couple to cargo when the UAV transports removable cargo, such as the temperature-controlled payload container 106. The UAV controller may receive flight data from a central controller and data from various sensors, which may be used to navigate the UAV from a fulfillment center to a delivery destination. Additional details about the UAV components 200 are provided below with reference to FIG. 7.

The components may include heat transfer components 218, which may include fluid ducts, temperature monitoring components, a pump, a compressor (and possible engine to support the compressor), heating coils, a heat pump, and/or other heat transfer components that may be used with the temperature-controlled payload container 106 to regulate temperature in one or more compartments of the container 106. Additional discussion of possible heat transfer components 218 is provided below with reference to FIGS. 3-5.

Figure 3:
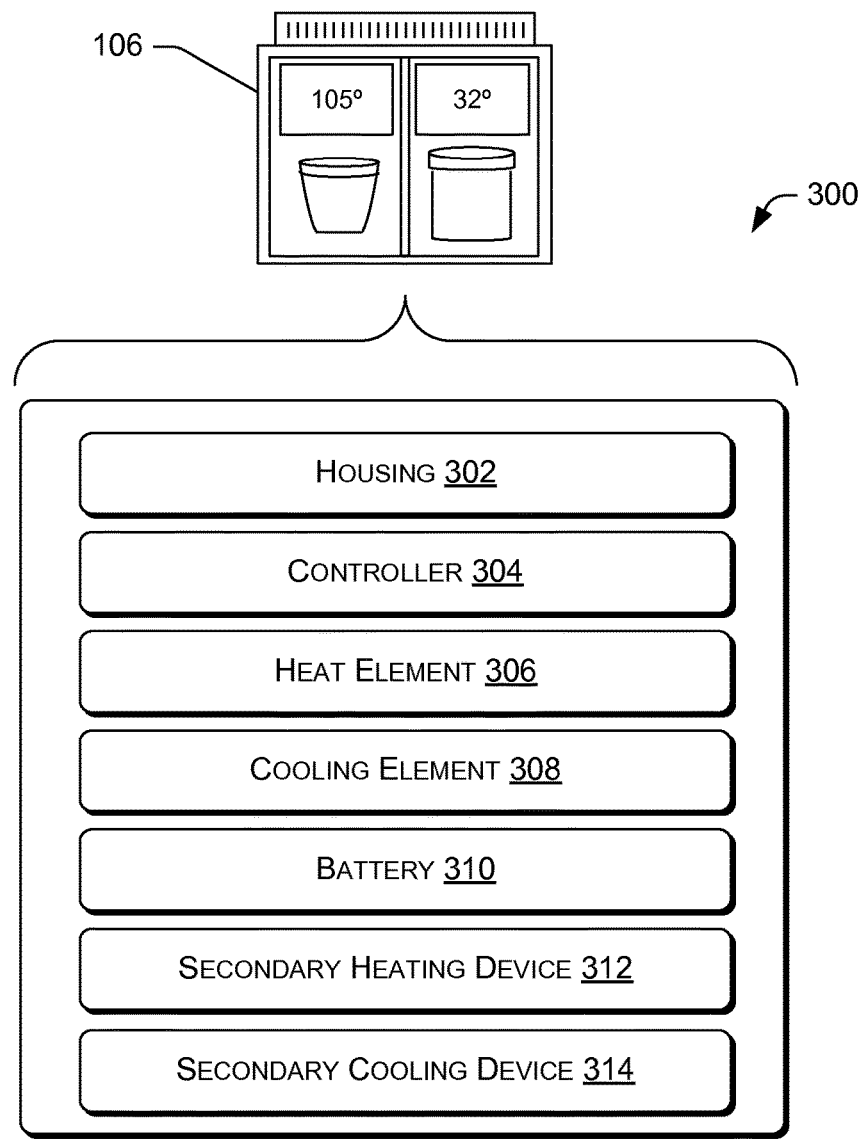
FIG. 3 is a block diagram of illustrative components of a temperature-controlled payload container.

FIG. 3 is a block diagram of illustrative components 300 of the temperature-controlled payload container 106. The components 300 may include a housing 302 of the container. The housing may provide structural support for items in the container 106 to enable transfer of those items to a destination. Thus, the housing 302 includes a structure to accommodate lifting the items having a known weight. The housing 302 may include one or multiple compartments. Individual compartments may be regulated at a particular temperature or adjusted to assume a particular temperature. For example, a first compartment may be designated as a cold compartment and second compartment may be designated as a hot compartment for a particular delivery. However, in a subsequent delivery, both the first compartment and the second compartment may be used as hot compartments, for example. The housing 302 may include insulation to reduce heat transfer from an environment outside of the container 106. The housing may also accommodate heating/cooling elements, such as ducting, as explained below.

The components 300 may include a controller 304 to control temperature of the compartments in the housing 302. The controller 304 may control a heat element 306 and/or a cooling element 308. For example, the heating element may be a heating coil that is controlled by the controller 304 through regulation of current supplied by a battery 310. The battery 300 may be included in the components. In some embodiments, the controller 304 may rely on power from the batteries 214 of the UAV 112, discussed with reference to FIG. 2. Other possible heating elements may include a heat pump, a heat exchanger, and/or other heat generating devices. However, as discussed below, some heating elements may be used as secondary devices to assist in providing heat with a primary device. Another example of a heating element 306 is a Peltier junction, which may also include the cooling element 308 depending on the configuration of the Peltier junction in the housing. For example, when the Peltier junction is used to divide two different compartments of the housing 302, the Peltier junction may encompass both the heating element 306 and the cooling element 308. Meanwhile, the cooling element may include a heat exchanger and/or other cooling elements that create a refrigeration cycle, such as a compressor.

A secondary heating device 312 may include any of the heating devices discussed above and be used to provide additional heat to a compartment of the housing 302 that is being heated. A secondary cooling device 314 may include any of the cooling devices discussed above and be used to provide additional cooling to a compartment of the housing 302 that is being cooled. For example, a secondary cooling device may be ice or dry ice that is added to a compartment to be cooled.

Figure 4:
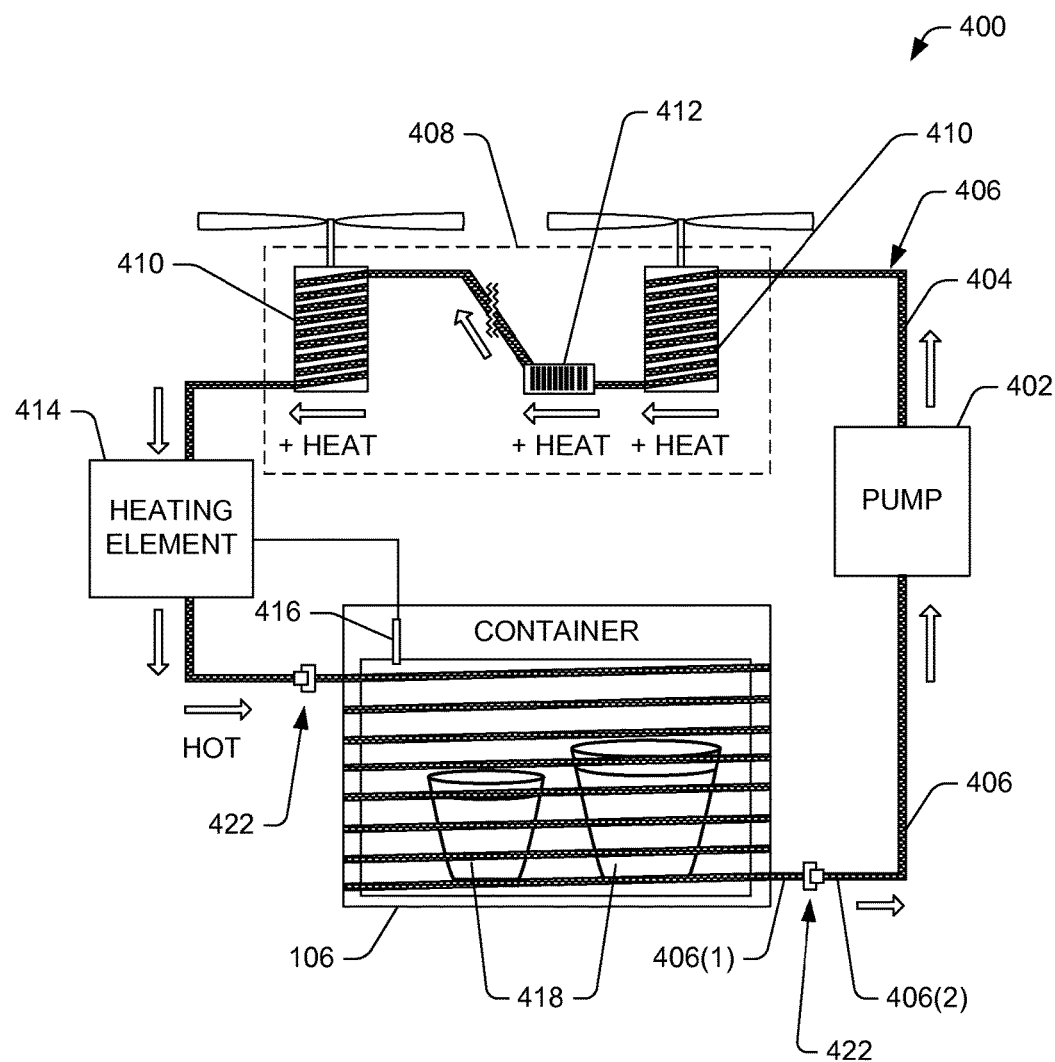
FIG. 4 is a schematic diagram showing an illustrative heating cycle that extracts heat from components of a UAV to heat a temperature-controlled payload container.

FIG. 4 is a schematic diagram showing an illustrative heating cycle 400 that extracts heat from components of a UAV to heat a temperature-controlled payload container. The heating cycle 400 is described from an initial reference point of a pump 402.

A pump 402 may cause circulation of a fluid 404 through a duct 406. The circulation may define the cycle 400. The pump 402 may be any type of conventional pump. However, given space and weigh considerations in flight, the pump 402 may be selected based on these factors as well as an ability to move the fluid through the cycle 400. The fluid 404 may be any type of fluid capable of efficiently receiving or absorbing heat and releasing or depositing heat to cooler components. The fluid may have a freezing point lower than a coldest expected temperature of the environment in which the UAV operates.

The fluid 404 may travel from the pump 402 to UAV components 408. The UAV components 408 may be any components that may give off heat that can be captured (e.g., wicked) by the fluid 404. Examples of the UAV components include a motor 410 and a controller 412. However, other components may give off heat, and may benefit from a cooling effect from interaction with the fluid 404. For example, the UAV components may include a battery. In some embodiments, temperature sensors may be used to measure a temperature of the fluid immediately before and immediately after the fluid has thermal interaction with a particular UAV component to determine a temperature delta for the particular UAV component. Further, the calculation may use the thermal conductivity properties of the fluid and the flow rate to enable a determination of heat removed or wicked from the particular UAV component. This information may be used for diagnostic purposes, such as to determine a component is operating within normal operational tolerances or operating outside of normal operational tolerances.

Following the UAV components 408, the fluid 404 may be guided by the duct 406 to a heating element 414, which may heat the fluid based on a determined temperature of the container 106. For example, the heater element 414 may receive signals from a thermostat in the container, which may cause the heating element 414 to provide more heat to the fluid that passes through the heating element 414. The heating element may be a heating coil, a heating pump, or any other type of heating device. The fluid 404 may then enter the container 106, such as a compartment that is to be heated, and give off heat to heat items 418. The fluid 404 may experience a reduction of heat after exiting the ducting in the container 106. The fluid 404 may complete the cycle by returning to the pump 402.

The arrangement of the cycle 400 and the order of the components may be modified without departing from the scope of the disclosure. For example, the pump 402 may be located between the UAV components 408 and the heating element 414 or in other locations. The heating element 414 may be located in or coupled to the container 106, or may be included in the UAV as part of the UAV components 408. Similarly, the pump 402 may be located in or coupled to the container 106, or may be included in the UAV as part of the UAV components 408.

In some embodiments, the duct 406 may include a first duct 406(1) associated with the UAV and a second duct 406(2) associated with the container 106. The first duct 406(1) may be coupled to the second duct 406(2) using duct couplers 422 that enable the fluid 404 to circulate between the first duct 406(1) and the second duct 406(2). By using the duct couplers 422, the container 106 may be detached from the UAV by uncoupling the first duct 406(1) from the second duct 406(2) at locations of the duct couplers 422.

Figure 5A:
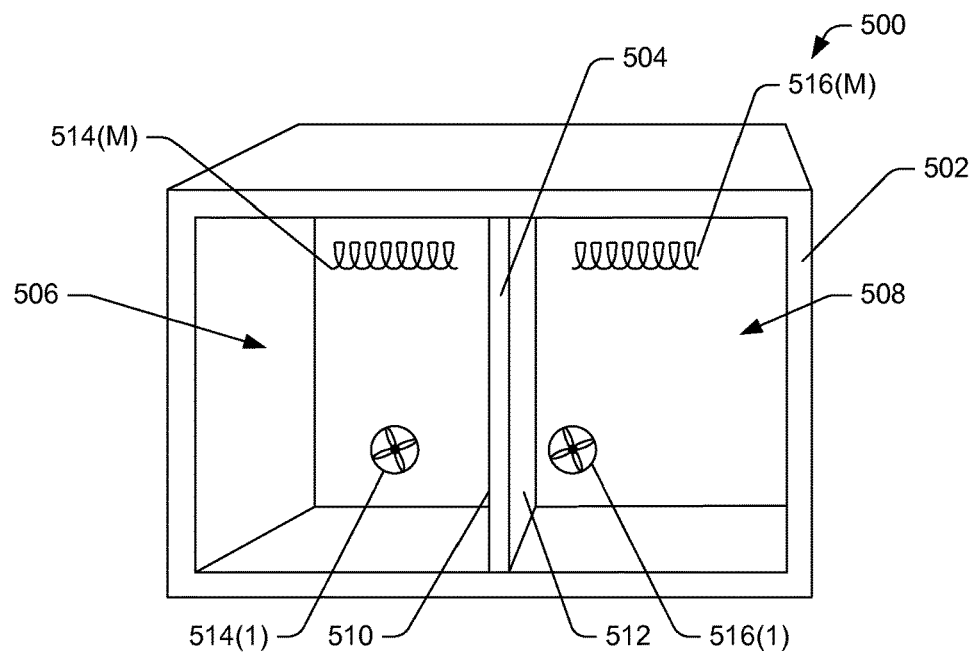
FIG. 5A is a top isometric view of an illustrative temperature-controlled payload container.

FIG. 5A is a top isometric view of an illustrative temperature-controlled payload container 500 (container 500") shown without a lid or battery. The container 500 may include a housing 502, which may define an interior cavity of the container used to transport items. The housing 502 may form a shell that may include insulation, attachment points for coupling by the UAV, and/or other features. In some embodiments, the housing 502 may include an aerodynamic design which minimizes draft when airflow crosses the container 500, such as during flight when coupled to a UAV.

The container 500 may include a Peltier junction 504, which may divide a portion of the container 500 into a first compartment 506 and a second compartment 508. Each compartment may be maintained at a different temperature depending on a temperature desired for an item or items in the respective compartment. A first side 510 of the Peltier junction 504 may be cooled and a second side 512 of the Peltier junction 504 may be heated when a current is applied to the Peltier junction 504 in a first direction. The first side 510 of the Peltier junction 504 may be heated and the second side 512 of the Peltier junction 504 may be cooled when a current is applied to the Peltier junction 504 in a second, opposite direction. The first compartment 506 may include one or more first temperature regulator device 514(1)-(M) while the second compartment 508 may include one or more second temperature regulator device 516(1)-(M). The temperature regulator devices 514, 516 may modify a temperature of the respective container to be cooler or hotter, such as by drawing in environmental air or exhausting interior air to the environment. For example, some of the temperature regulator devices 514(1)-(M), 516(1)-(M) may be fans, heating coils, and/or heat pumps. The temperature regulator devices 514(1)-(M), 516(1)-(M) may be in communication with a controller and/or a thermostat to enable adjustment/regulation of the temperature. In addition the Peltier junction 504 may be in communication with a controller and/or a thermostat to enable adjustment/regulation of the temperature.

Figure 5B:
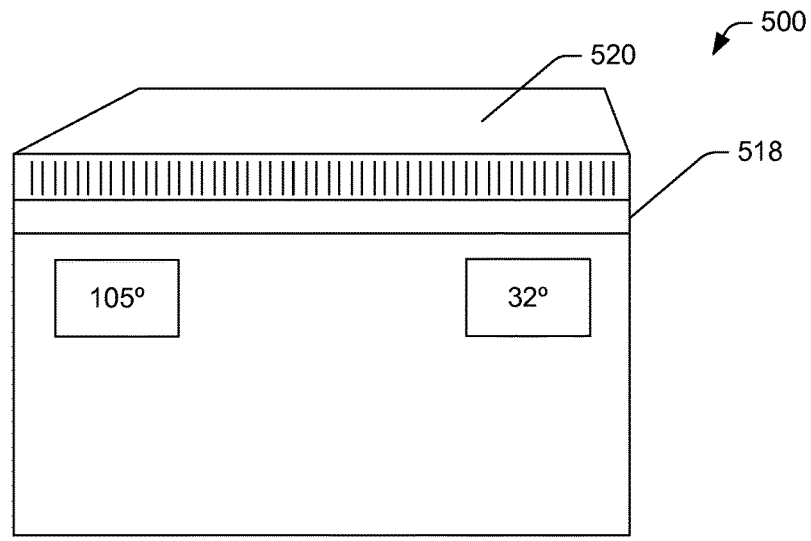
FIG. 5B is a side elevation view of the illustrative temperature-controlled payload container shown in FIG. 5A.

FIG. 5B is a side elevation view of the illustrative temperature-controlled payload container 500 with a lid and a battery. As shown in FIG. 5B, the container 500 may include a lid 518 and a battery 520. In some embodiments, the container 500 may not include the battery 520, but may rely on the batteries of the UAV for power. However, a dedicated battery may reduce drain on the batteries of the UAV, often relied upon for flight, and may enable continued heating/cooling after the container is deposited at a destination. In some embodiments, the battery may detach from the lid, which may enable the UAV to transport the battery back to a fulfillment center or other location rather than leave the battery at the destination.

Figure 6A:
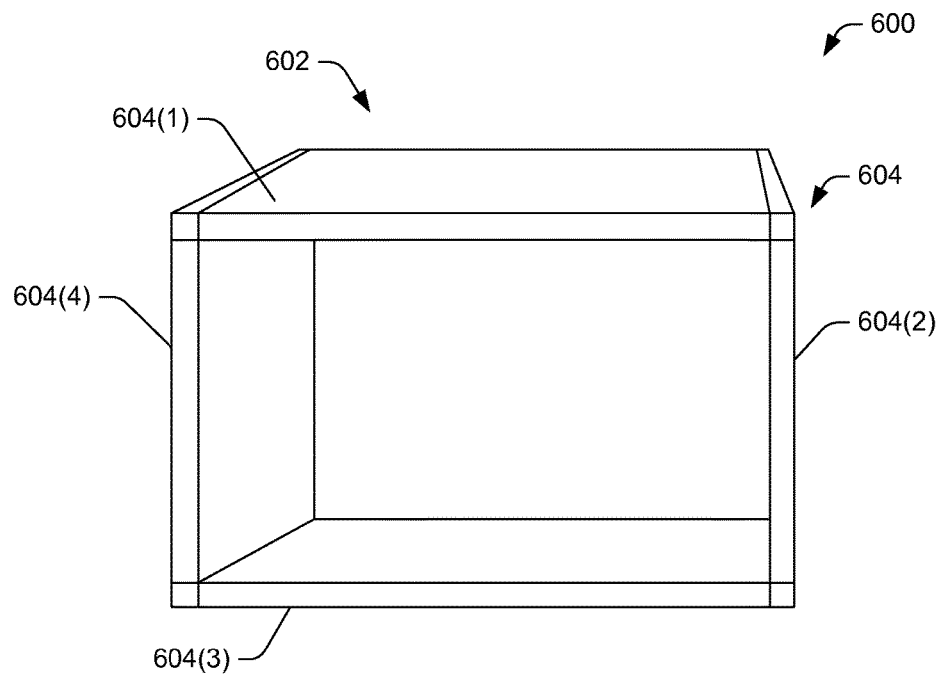
FIG. 6A is a top isometric view of another illustrative temperature-controlled payload container.

FIG. 6A is a top isometric view of another illustrative temperature-controlled payload container 600 (container 600") shown without a lid or battery. The container 600 may include a housing 602, which may define an interior cavity of the container used to transport items. In some embodiments, the housing 602 may include an aerodynamic design which minimizes draft when airflow crosses the container 600, such as during flight when coupled to a UAV.

The housing 602 may be formed, at least in part, by Peltier junctions 604. In some embodiments, the sidewalls of the housing may be implemented as Peltier junctions 604(1), 604(2), 604(3), and 604(4). However, in various embodiments, fewer of the sidewalls may be implemented as Peltier junctions, such as one sidewall, two sidewalls, or three sidewalls. By using Peltier junctions, the contents of the container 600 may be cooled when a current for the Peltier junctions is flowing in a first direction and may be heated when the current is flowing in a second, opposite direction. Thus, using this configuration, the container 600 may be used to heat an item during a first delivery and then be used to cool an item during a second, different delivery. Similarly, the container may be used to heat, then cool an item, for example, such as to precisely adjust a temperature of an item to achieve an ideal temperature of the item prior to arrival at a destination. In some embodiments, temperature regulator devices, such as the temperature regulator devices 514, 516 shown in FIG. 5A may be used to supplement the Peltier junction.

Figure 6B:
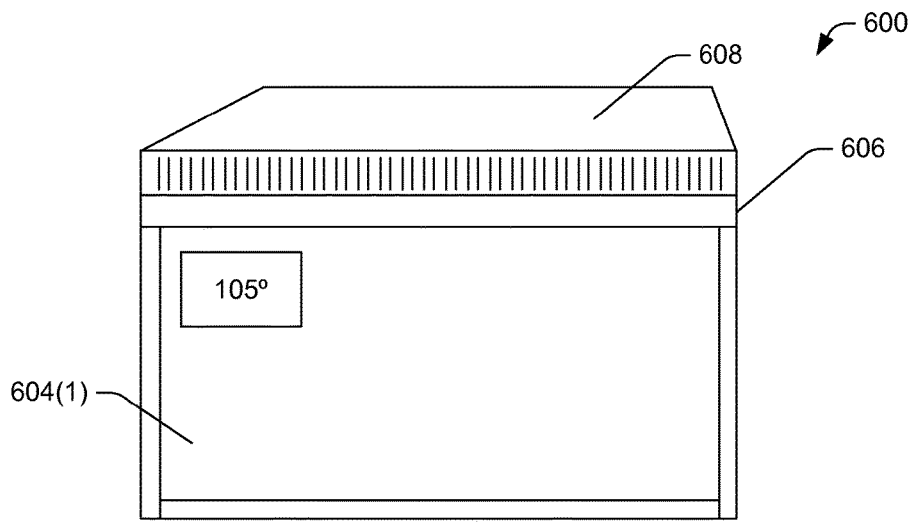
FIG. 6B is a side elevation view of the illustrative temperature-controlled payload container shown in FIG. 6A.

FIG. 6B is a side elevation view of the illustrative temperature-controlled payload container 600 with a lid and a battery. As shown in FIG. 6B, the container 600 may include a lid 606 and a battery 608. In some embodiments, the container 600 may not include the battery 608, but may rely on the batteries of the UAV for power. However, a dedicated battery may reduce drain on the batteries of the UAV, often relied upon for flight, and may enable continued heating/cooling after the container is deposited at a destination. In some embodiments, the battery may detach from the lid, which may enable the UAV to transport the battery back to a fulfillment center or other location rather than leave the battery at the destination.

Figure 7:
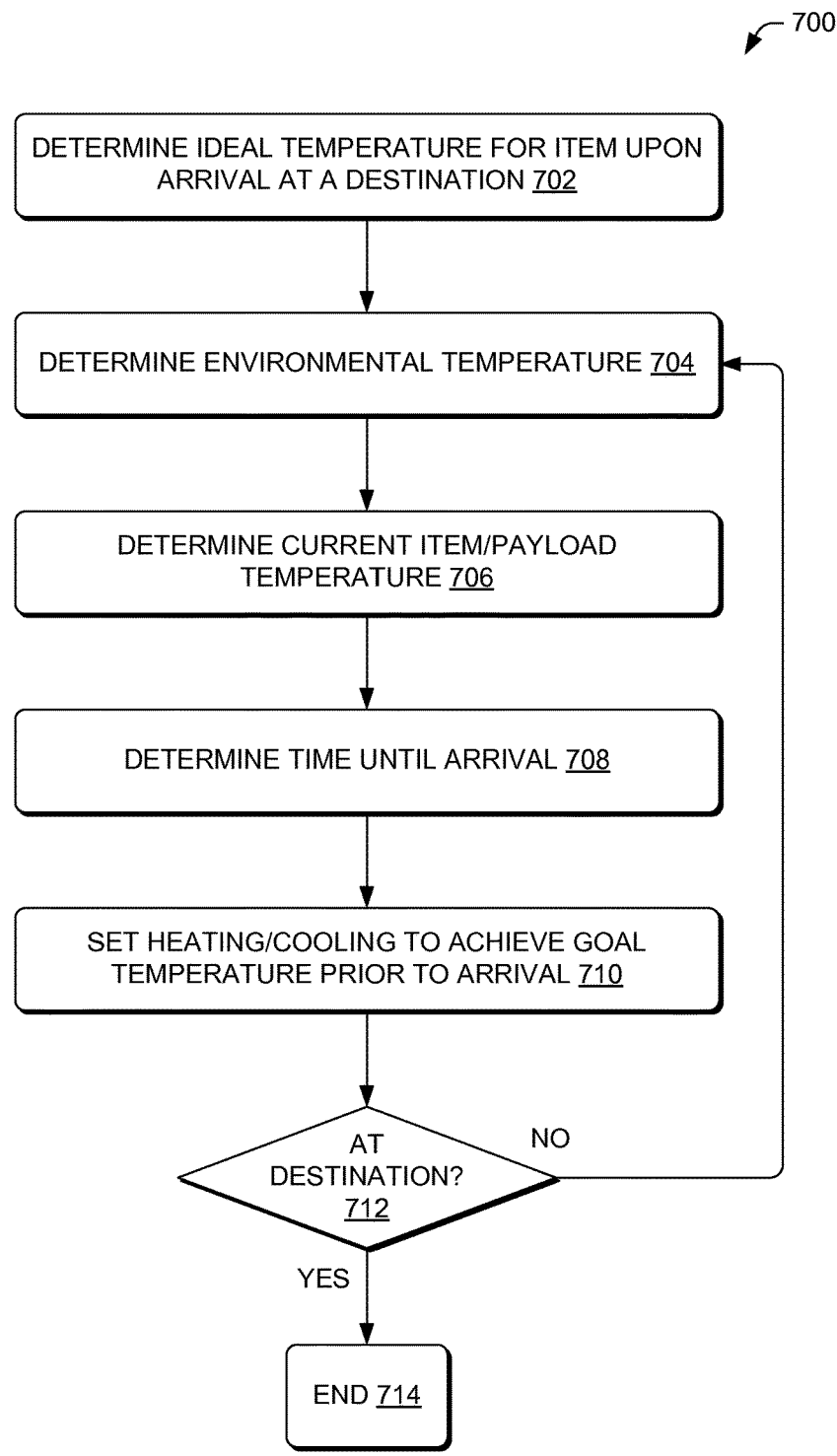
FIG. 7 is a flow diagram of an illustrative process to control temperature of a temperature-controlled payload container during a flight to a destination.

FIG. 7 is a flow diagram of an illustrative process 700 to control temperature of a temperature-controlled payload container during a flight to a destination. The process 700 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

The process 700 is described with reference to the components 200 shown in FIG. 2 and the components 300 shown in FIG. 3. The process may be performed by the temperature controller 208 and/or the controller 304.

At 702, a controller may determine an ideal temperature for an item upon arrival at a destination. For example, an item may be a pizza that has an ideal temperature of 200 degrees F. upon arrival at a destination. As another example, a second item may include an ideal temperature of 40 degrees F. upon arrival at a destination, such as smoothie or beverage.

At 704, the controller may determine an environmental temperature. The environmental temperature may be a temperature outside of the container that the container is exposed to. The amount of insulation and properties of insulation, when factored in with the environmental temperature, may determine temperature loss or gain (from the perspective of inside of the container) from the environmental temperature.

At 706, the controller may determine a current item or payload temperature. The item/payload temperature may be an actual or estimated temperature of an item of payload. For example, the item/payload temperature may indicate that a pizza is 185 degrees F. or that a smoothie is 42 degrees F.

At 708, the controller may determine a time until arrival at the destination. For example, the controller may determine that the UAV requires ten more minutes to reach the destination, and thus ten minutes are available to selectively heat or cool compartments of the container to achieve respective ideal temperatures of items.

At 710, the controller may set heating/cooling to achieve the ideal temperature prior to arrival at the destination based at least in part on the determinations from the operations 702-708. For example, the controller may activate secondary heating elements to quickly raise a temperature in a first compartment that contains a pizza. In some embodiments, the controller may set heating/cooling to allow a temperature change to a threshold temperature. For example, the controller may allow a pizza to cool to a threshold temperature, but not below. If the temperature cools to below the ideal temperature, then the controller may activate heating to achieve the ideal temperature.

At 712, the controller may determine whether the container is at the destination. When the container is not at the destination (following the "no" route), then the process 700 may continue at the operation 704. When the container is at the destination (following the "yes" route), the process may end at 714 or may continue until the container is opened by a consumer.

Figure 8:
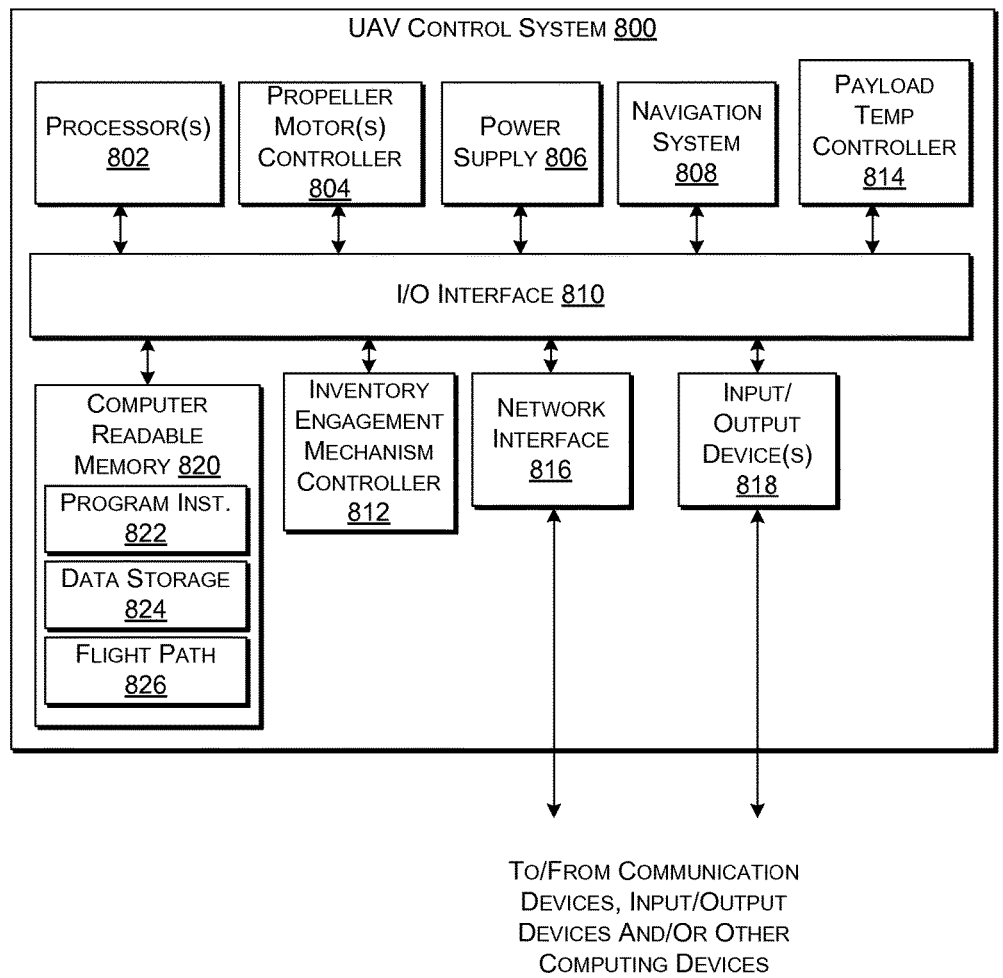
FIG. 8 is a block diagram of an illustrative control system of the UAV.

FIG. 8 is a block diagram of an illustrative control system of the UAV. In various examples, the block diagram may be illustrative of one or more aspects of the UAV control system 800 that may be used to implement the various systems, devices, and techniques discussed above. In the illustrated implementation, the UAV control system 800 includes one or more processors 802, coupled to a non-transitory computer readable storage medium 820 via an input/output (I/O) interface 810. The UAV control system 800 may also include a propeller motor controller 804, power supply module 806, and/or a navigation system 808. The UAV control system 800 further includes an inventory engagement mechanism controller 812, a payload temperature controller 814, a network interface 816, and one or more input/output devices 818.

In various implementations, the UAV control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and flight path data 826, respectively. In other implementations, program instructions, data, and/or flight paths may be received, sent, or stored upon different types of computer-accessible media, such as non-transitory media, or on similar media separate from the non-transitory computer readable storage medium 820 or the UAV control system 800. Generally speaking, a non-transitory, computer readable storage medium may include storage media or memory media such as flash memory (e.g., solid state memory), magnetic or optical media (e.g., disk) coupled to the UAV control system 800 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propeller motor(s) controller 804 communicates with the navigation system 808 and adjusts the power of each propeller motor to guide the UAV along a determined flight path. The power supply module 806 may control the charging and any switching functions associated with one or more power modules (e.g., batteries) of the UAV.

The navigation system 808 may include a GPS or other similar system that can be used to navigate the UAV to and/or from a location. The inventory engagement mechanism controller 812 communicates with the actuator(s) or motor(s) (e.g., a servo motor) used to engage and/or disengage inventory. For example, when the UAV is positioned over a level surface at a delivery location, the inventory engagement mechanism controller 812 may provide an instruction to a motor that controls the inventory engagement mechanism to release the inventory.

The payload temperature controller 814 performs at least some of the operations described in the process 600 above. The payload temperature controller 814 may cause or manage interactions, signal exchanges, and other processes to enable heating, cooling, or maintaining a temperature in the container through use of components of the UAV and/or components of the container.

The network interface 816 may be configured to allow data to be exchanged between the UAV control system 800 and other devices attached to a network, such as other computer systems, and/or with UAV control systems of other UAVs. For example, the network interface 816 may enable wireless communication between numerous UAVs. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, image capture devices, thermal sensors, infrared sensors, time of flight sensors, accelerometers, pressure sensors, weather sensors, airflow sensors, etc. Multiple input/output devices 818 may be present and controlled by the UAV control system 800. One or more of these sensors may be utilized to assist in landings as well as avoiding obstacles during flight.

As shown in FIG. 8, the memory may include program instructions 822 which may be configured to implement the example processes and/or sub-processes described above. The data storage 824 may include various data stores for maintaining data items that may be provided for determining flight paths, retrieving inventory, landing, identifying a level surface for disengaging inventory, determining ideal temperatures for specific items, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 800 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 800 may be transmitted to the UAV control system 800 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    an unmanned aerial vehicle (UAV) configured to transport an item to a destination; and
    a temperature-controlled payload container to contain the item during the transport, the temperature-controlled payload container comprising:
        a power source;
        a heating element to increase a temperature of the item in the temperature-controlled payload container, the heating element comprising a fluid that circulates through a duct to transfer heat from components of the UAV and that deposits the heat in a compartment that contains the item, wherein the components comprise at least one of a controller or a battery; and
        a cooling element to decrease the temperature of the item in the temperature-controlled payload container, the cooling element comprising at least one of a Peltier junction, a heat exchanger, or a refrigeration cycle compressor powered by the power source.

2. The system as recited in claim 1, wherein the heating element further comprises the Peltier junction and the cooling element comprises the Peltier junction, and wherein the temperature-controlled payload container includes a first compartment and a second compartment adjacent to the first compartment; and wherein the Peltier junction divides at least a first portion of the first compartment from at least a second portion of the second compartment, the Peltier junction, when provided a current in a first direction, to remove heat from the second compartment and provide heat to the first compartment.

3. The system as recited in claim 2, wherein the first compartment includes a heating coil to provide additional heat to the first compartment.

4. The system as recited in claim 1, wherein the UAV includes a first ducting and at least one of: (i) a plurality of motors, (ii) the battery, (iii) or the controller, wherein the first ducting circulates the fluid past or around the at least one of (i) the plurality of motors, (ii) the battery, or (iii) the controller,
    and wherein the temperature-controlled payload container includes a second ducting in fluid communication with the first ducting, wherein the second ducting circulates the fluid past or around the compartment in the temperature-controlled payload container.

5. The system as recited in claim 4, wherein the UAV further includes a heating coil to selectively heat the fluid prior to entry by the fluid into the second ducting.

6. The system as recited in claim 4, wherein the UAV further includes a pump that circulates the fluid from the first ducting to the second ducting in the cycle.

7. The system as recited in claim 4, wherein the fluid circulates from the first ducting to the second ducting in a cycle to transfer heat from the at least one of the plurality of motors, the battery, or the controller to the item in the temperature-controlled payload container.

8. The system as recited in claim 1, wherein the UAV includes a temperature controller, the temperature controller including a processor to perform actions including:
    receiving a current temperature of the item;
    receiving an ideal temperature of the item; and
    controlling the circulation of the fluid based at least in part on the current temperature to achieve the ideal temperature prior to arrival of the item at the destination.

9. The system as recited in claim 8, wherein the actions of the processor further include receiving a temperature outside of the temperature-controlled payload container, and wherein the controlling is based at least in part on the temperature outside of the temperature-controlled payload container.

10. A system comprising:
an unmanned aerial vehicle (UAV) configured to transport an item to a destination; and
a temperature-controlled payload container to contain the item during the transport, the temperature-controlled payload container including a heating element configured to circulate fluid through a duct to transfer heat from at least one of a controller or a power source of the UAV to the temperature-controlled payload container, a cooling element, and a temperature controller configured to receive temperatures from a temperature sensor and control power supplied to the heating element and the cooling element based at least in part on the temperatures received.

11. The system of claim 10, wherein the power source includes a battery that is detachably coupled to the temperature-controlled payload container.

12. The system of claim 10, wherein the power source includes a battery that supplies first power to propulsion units of the UAV and supplies second power to the temperature-controlled payload container.

13. The system of claim 10, wherein the heating element additionally comprises at least one of a Peltier junction or a heating coil, and the cooling element is selected from at least one of the Peltier junction, a heat exchanger or a refrigeration cycle compressor.

14. The system of claim 10, wherein the payload container includes an insulated housing with sidewalls, the insulating housing defining a first compartment, and wherein the heating element and the cooling element are each in at least one of the sidewalls of the insulated housing.

15. The system of claim 14, further comprising a second compartment, wherein the first compartment includes the heating element in the at least one of the sidewalls, and the second compartment includes the cooling element in the at least one of the sidewalls.

16. The system of claim 15, further comprising a second heating element comprising a Peltier junction located between the first compartment and the second compartment, wherein the cooling element also comprises the Peltier junction.

17. The temperature-controlled payload container of claim 16, wherein the Peltier junction is configured to simultaneously heat the first compartment and cool the second compartment.

18. An unmanned aerial vehicle (UAV) comprising:
an electric motor;
a controller configured to control the motor;
a battery; and
a payload container to contain an item during transport of the item, the payload container comprising:
a heating element configured to increase a temperature of the item in the payload container, the heating element comprising a fluid that circulates through a duct to transfer heat from at least one of the electric motor, the controller, or the battery, and deposit the heat in a compartment that contains the item; and
a cooling element configured to decrease the temperature of the item in the payload container, the cooling element comprising at least one of a Peltier junction, a heat exchanger, or a refrigeration cycle compressor.

19. The UAV of claim 18, further comprising a pump that circulates the fluid through the duct.

20. The UAV of claim 18, further comprising a temperature controller,
the temperature controller including a processor to perform actions comprising:
receiving a current temperature of the item;
receiving an ideal temperature of the item; and
controlling the circulation of the fluid based at least in part on the current temperature to achieve the ideal temperature prior to arrival of the item at a destination.

* * * * *